(12) United States Patent  (10) Patent No.: US 9,475,418 B2
Goldman (45) Date of Patent: Oct. 25, 2016

(54) CATCH ALL

(71) Applicant: John G. Goldman, Fort Myers, FL (US)

(72) Inventor: John G. Goldman, Fort Myers, FL (US)

( * ) Notice: Subject to any disclaimer, the term of this patent is extended or adjusted under 35 U.S.C. 154(b) by 0 days.

(21) Appl. No.: 14/560,684

(22) Filed: Dec. 4, 2014

(65) Prior Publication Data

US 2015/0151660 A1    Jun. 4, 2015

Related U.S. Application Data

(60) Provisional application No. 61/911,541, filed on Dec. 4, 2013.

(51) Int. Cl.
*B60J 9/00* (2006.01)
*B60N 3/10* (2006.01)

(52) U.S. Cl.
CPC .................... *B60N 3/108* (2013.01)

(58) Field of Classification Search
CPC ....................................... B60N 3/108
See application file for complete search history.

(56) References Cited

U.S. PATENT DOCUMENTS

2002/0067031 A1* 6/2002 Busgen .................. B60R 21/18
    280/733
2012/0067760 A1* 3/2012 Tschantz .............. B65D 81/052
    206/522

* cited by examiner

*Primary Examiner* — Lori L Lyjak
(74) *Attorney, Agent, or Firm* — William E. Noonan (57) ABSTRACT

The present invention includes a vehicle interior debris deflector, for obstructing a gap between a passenger seat, a console unit and a safety belt receiving element, including an inflatable chamber having a first side and second side fused to one another along a seam. When placed in the gap between the seat, the console unit and the belt element, the inflatable chamber extends longitudinally from a front portion of the passenger seat to a back portion of the passenger seat and is adjacent and abutting to the console unit. A valve is embedded in one of the first side and the second side for adding and removing fluid from the inflatable chamber. When the chamber is partially inflated, the chamber expands and compresses to fill the gap and can slide parallel to the seat, the console unit and the safety belt element without losing expansion and compression.

11 Claims, 4 Drawing Sheets

CATCH ALL

CROSS-REFERENCE TO RELATED APPLICATION

This application claims reference to a previously filed Provisional Patent Application 61/911,541 filed Sep. Dec. 4, 2013, which is incorporated by reference herein.

FIELD OF THE INVENTION

The present invention relates to vehicle interior debris deflectors.

BACKGROUND OF THE INVENTION

Vehicle interior debris deflection apparatuses generally act to inhibit debris from falling and/or locating to sites within a passenger compartment of an automobile, marine vessel or an aircraft. Vehicle interior debris deflection apparatuses generally may be used in a number of vehicles and vary in shape and size. A typical generic apparatus often include components consisting of fiberfill, foam, polystyrene beads, wool, cotton, polyester, and polymer gels.

SUMMARY OF THE INVENTION

It is, therefore, an object of the present invention to provide a vehicle interior debris deflector named a CATCH ALL. It is another object of the present invention to provide a method of using said vehicle interior debris deflector. A method to service such deflector is also contemplated.

An exemplary environment for the present invention can include, but is not limited to, a vehicle passenger compartment, for example, the passenger seating areas of an automobile, an marine vessel, an aircraft and any other environment in which debris deflection is desired for discreet localities.

In an exemplary embodiment of the present invention, a vehicle interior debris deflector can include: an inflatable chamber and a valve.

In an exemplary aspect of the present invention, the inflatable chamber has a first side and second side fused to one another along a seam.

In another exemplary aspect of the present invention, the valve is embedded in at least one of the first side and the second side.

In a further exemplary aspect of the present invention, when the inflatable chamber is placed in the gap between a passenger seat, a console unit and a safety belt receiving element, the inflatable chamber can extend longitudinally from a front portion of the passenger seat to a back portion of the passenger seat and can be adjacent and abutting to the console unit.

In still yet another exemplary aspect of the present invention, a valve can be configured in such a way as for adding and removing air from the inflatable chamber.

In another exemplary aspect of the present invention, if the inflatable chamber is at least partially inflated via the valve, the inflatable chamber can expand and compress to fill the gap between the passenger seat, the console unit and the safety belt receiving element.

In a further exemplary aspect of the present invention, the inflatable chamber can slide parallel to the passenger seat, the vehicle console unit and the vehicle safety belt receiving element without losing expansion and compression when the vehicle passenger seat is engaged in longitudinal motion.

An exemplary material for any portion of the present invention can include, but is not limited to, one or more of the following: polyvinyl chloride (also known as PVC), vinyl, thermoplastics, for example, polyethylene, polypropylene, polystyrene, polyesters, polycarbonate, PVC, nylon, polymath methacrylate, and other pliable plastics. Other materials are considered, including, fabrics, textiles and other materials which can hold a solid and/or liquid in such a manner to assist with debris deflection in discreet areas.

The following are additional and/or exemplary aspects of the present invention, one or more of which can be combined with the basic invention as embodied above:

the inflatable chamber can be formed of a resiliently deformable material capable of reversible compressible conformation to the shape of the gap;

the first side of the inflatable chamber can be formed of at least one of a resiliently deformable material capable of reversible compressible conformation to the shape of the gap and the second side of the inflatable chamber comprises at least one of a different resiliently deformable material capable of reversible compressible conformation to the shape of the gap;

the inflatable chamber can extend longitudinally beyond the back portion of the passenger seat;

the inflatable chamber can further include: one or more of the inflatable chamber, further including one or more second inflatable chambers joined to the first inflatable chamber along their respective seams;

the inflatable chamber can further include: one or more of the inflatable chamber, wherein an interior surface area defined by the inflatable chamber is larger than a planar area defined by the one or more second inflatable chambers, fixedly joined with the first inflatable chamber along their respective seams;

the valve can further include a leak reducing element, wherein the leak reducing element is compressed when the inflatable chamber is being inflated and/or deflated;

the valve can further include an automatic inflating apparatus, wherein when the automatic inflating apparatus is activated; the inflatable chamber expands and compresses to fill the gap;

where there is one or more of the inflatable chamber, the one or more chambers can include one or more second inflatable chambers joined to the first inflatable chamber along their respective seams further comprise one or more valves; and where the valves of the one or more of the inflatable chamber can further include one or more second inflatable chambers joined to the first inflatable chamber along their respective seams further comprise one or more automatic inflating apparatus, wherein when the one or more automatic inflating apparatus are activated, the one or more inflatable chambers and one or more second inflatable chambers expand and compress to the gap at different rates based on a pressure differential sensor contained in the one or automatic inflating apparatuses.

Additional exemplary embodiments include methods of using the inflatable debris deflector with any embodiment or combination of embodiments of the inflatable debris deflector described herein; and a method of servicing any embodiment or combination of embodiments of the inflatable debris deflector described herein, where at least one of the inventive elements of the inflatable debris deflector are serviced. Servicing can include, but is not limited to, general maintenance, repair, modification and/or replacement in whole or in part.

One exemplary method of using the inflatable debris deflector can include, but is not limited to: inflating an inflatable chamber via a valve; placing the inflatable chamber in a gap between a passenger seat, a console unit and a safety belt receiving element, wherein the inflatable chamber expands and compresses to fill the gap between the passenger seat, the console unit and the safety belt receiving element; adjusting an inflated volume of the inflatable chamber via the valve; and operating the passenger seat, wherein the inflatable chamber slides parallel to the passenger seat, the vehicle console unit and the vehicle safety belt receiving element without losing expansion and compression when the vehicle passenger seat is engaged in longitudinal motion.

An exemplary aspect of the method can include the inflatable chamber extending longitudinally beyond the back portion of the passenger seat.

An additional exemplary aspect of the method can include the inflatable chamber further comprising one or more of the inflatable chamber, further comprising one or more second inflatable chambers joined to the first inflatable chamber along their respective seams.

Another exemplary aspect of the method can include the inflatable chamber further comprises: one or more of the inflatable chamber, wherein an interior surface area defined by the inflatable chamber is larger than a planar area defined by the one or more second inflatable chambers, fixedly joined with the first inflatable chamber along their respective seams.

Yet another exemplary aspect of the method can include the valve further comprising a leak reducing element, wherein the leak reducing element is compressed when the inflatable chamber is being inflated and/or deflated.

Still yet another exemplary aspect of the method can include the valve further comprising an automatic inflating apparatus, wherein when the automatic inflating apparatus is activated; the inflatable chamber expands and compresses to fill the gap.

A further exemplary aspect of the method can include the one or more of the inflatable chamber further comprising one or more second inflatable chambers joined to the first inflatable chamber along their respective seams further comprise one or more valves.

And yet still a further exemplary aspect of the method can include the valves of the one or more of the inflatable chamber further comprising one or more second inflatable chambers joined to the first inflatable chamber along their respective seams further comprise one or more automatic inflating apparatus, wherein when the one or more automatic inflating apparatus are activated, the one or more inflatable chambers and one or more second inflatable chambers expand and compress to the gap at different rates based on a pressure differential sensor contained in the one or automatic inflating apparatuses.

Another exemplary method of using the vehicle interior debris deflector can comprise a method of servicing the vehicle interior debris deflector, including but not limited to general maintenance, repair modification and replacement in whole or in part one of, individually or in combination with one another, any of the following: an inflatable chamber having a first side and a second side joined along a seam, and a valve embedded in at least one of the first side and/or the second side of the inflatable chamber.

One exemplary aspect of the servicing method can further include general maintenance, repair, modification, and/or replacement in whole or in part of a valve further comprising an automatic inflating apparatus, wherein when the automatic inflating apparatus is activated, the inflatable chamber expands and compresses.

These and other exemplary aspects of the present invention are described herein.

Those skilled in the art will recognize still other aspects of the present invention upon reading and understanding the attached description.

BRIEF DESCRIPTION OF THE DRAWINGS

The present invention is illustrated by way of example, and not in limitation, in the figures of the accompanying drawings.

DETAILED DESCRIPTION OF THE INVENTION

The present invention will now be described in more detail by way of example with reference to the embodiments shown in the accompanying figures. It should be kept in mind that the following described embodiments are only presented by way of example and should not be construed as limiting the inventive concept to any particular physical configuration, material or order.

The present invention pertains generally to debris defectors, and more specifically to a vehicle interior debris deflector named CATCH ALL, which occupies a gap disposed between, and having a shape and a width at least partially defined by, a vehicle seat, an adjacent console and a seat belt attachment element. The deflector consisting essentially of a resiliently deformable material capable of reversible and/or compressible conformation to the shape of the gap so as to obstruct the passage of objects into the gap.

Figure 2:
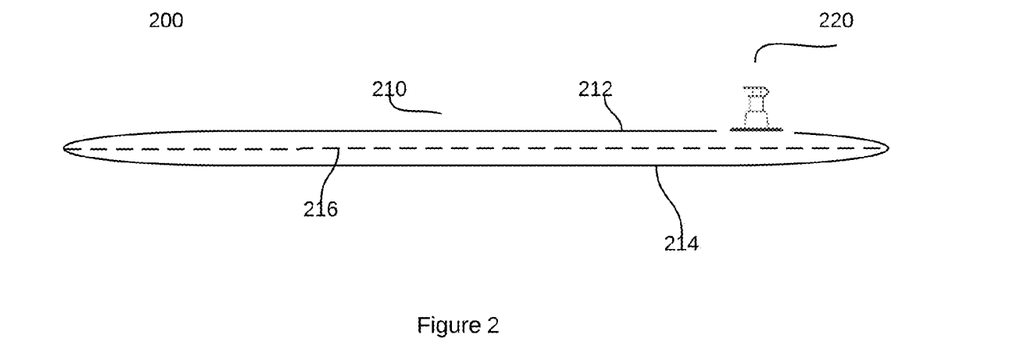
FIG. 2 illustrates an exemplary embodiment of the present invention, more specifically, a side view of the debris deflector apparatus.
Figure 3:
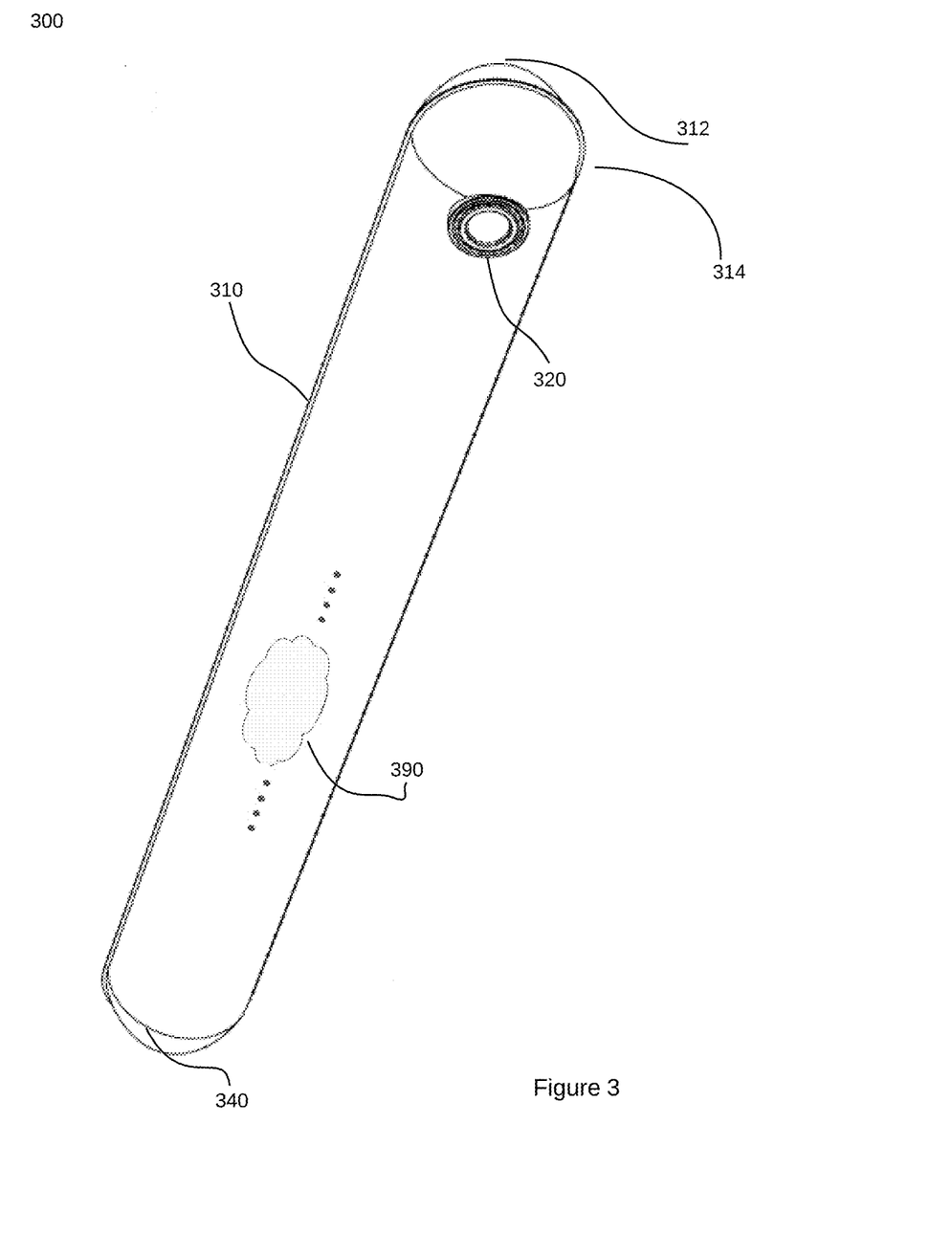
FIG. 3 illustrates an exemplary embodiment of the present invention, more specifically, a perspective view of the debris deflector apparatus while fully inflated.
Figure 4:
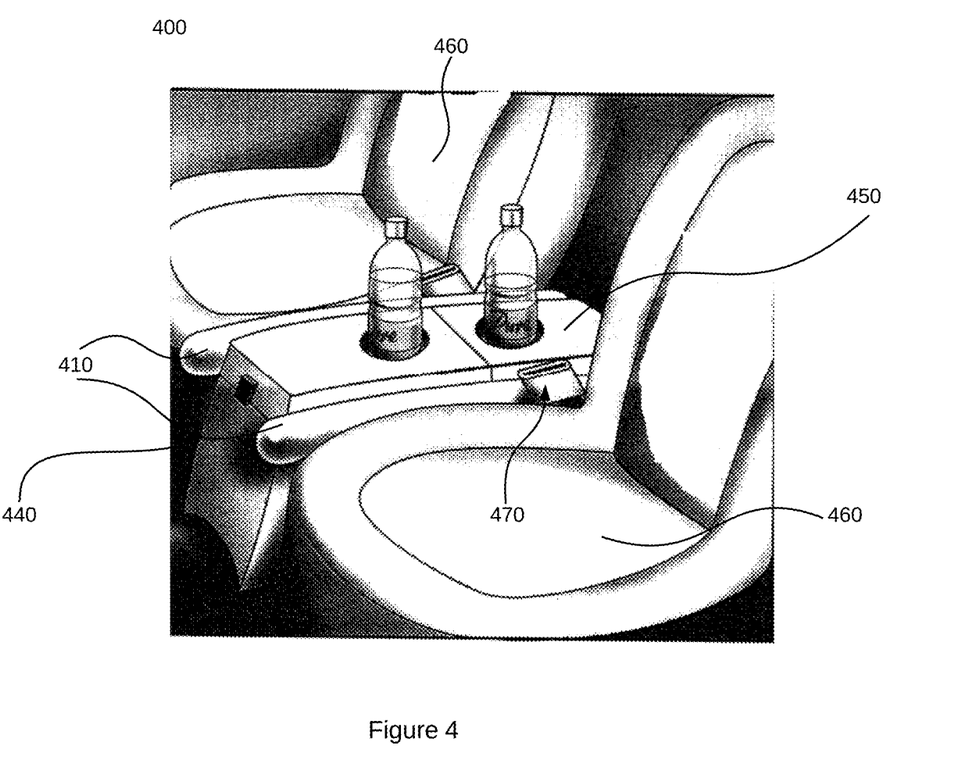
FIG. 4 illustrates an exemplary use and exemplary environment for use of the present invention, more specifically, the passenger compartment of a motor vehicle.
Figure 5:
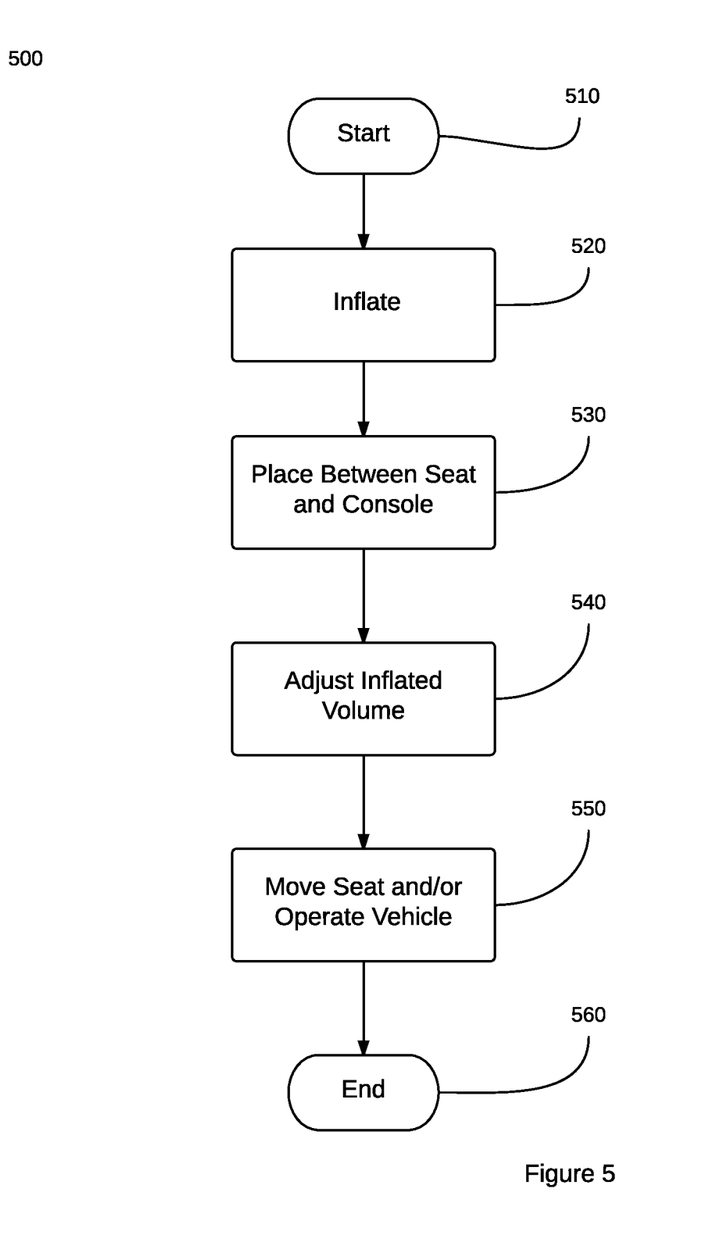
FIG. 5 illustrates a flow chart depicting one exemplary method of using any and/or all combinations of the present invention.

FIGS. 1-4, as described below, illustrate one exemplary embodiment of the CATCH ALL. This exemplary embodiment will be shown in top view (FIG. 1), side view (FIG. 2), expanded to capacity volume (FIG. 3), and in an exemplary environment (FIG. 4). FIG. 5 illustrates an exemplary method of using the exemplary embodiment illustrated in FIGS. 1-4. Additional embodiments are also contemplated, with various individual limiting elements which can be implemented individually or in combination with one another. These additional embodiments will be described, however, following the descriptions of FIGS. 1-5.

Figure 1:
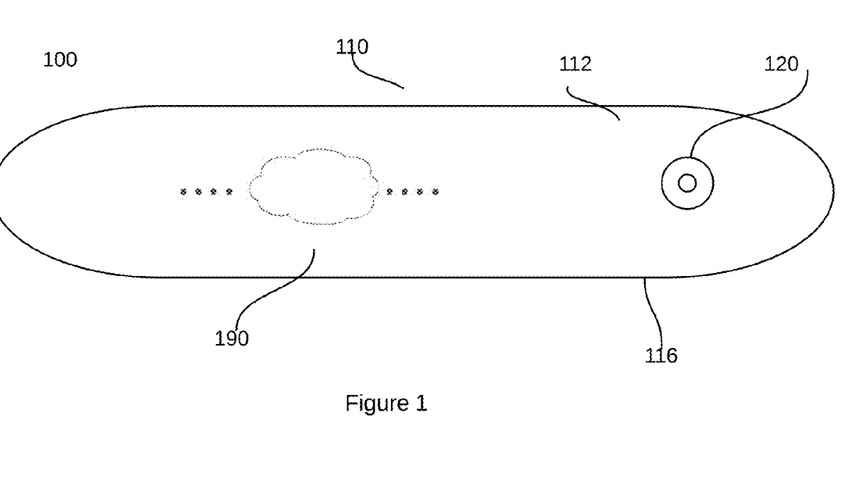
FIG. 1 illustrates an exemplary embodiment of the present invention, more specifically, a top view of the debris deflector apparatus.

FIG. 1 illustrates one exemplary embodiment of the present invention, more specifically, a top view of the vehicle interior debris deflector 100. The vehicle debris deflector, as illustrated in FIG. 1, has a purpose of occupying a gap disposed between a vehicle seat, an adjacent console and a seat belt attachment element, so as to deflect and/or stop small debris from entering the gap between the vehicle seat, the adjacent console and the seat belt attachment element.

The vehicle interior debris deflector 100 includes an inflatable chamber 110 and a valve 120.

As illustrated in the top view of FIG. 1, inflatable chamber 110 has an oval shape, and when expanded, a cylindrical shape. However, any functionally compatible shape can be fabricated for the inflatable chamber. For example, square, cubic, triangular, and conical shapes can also be fabricated. Additional functionally compatible shapes are also contemplated, including, but not limited to helical, trapezoidal, and any other functional planar and/or dimensional shape which can be formed.

Inflatable chamber 110 can be formed from a deformable plastic, for example, polyvinyl chloride (also known as PVC). However, a number of materials are contemplated in additional embodiments of the present invention, including but not limited to, vinyl, thermoplastics, for example, polyethylene, polypropylene, polystyrene, polyesters, polycarbonate, nylon, polymath methacrylate, and other pliable plastics. Other materials are considered, including, fabrics, textiles and other materials which can hold a solid and/or liquid in such a manner to assist with debris deflection in discreet areas.

Inflatable chamber 110 is composed of first side 112 and a second side (not illustrated) fused to one another along a seam 116. Since FIG. 1 is a top view, the second side will be discussed in more detail with reference to FIG. 2. The first side can be formed of one or more, but at least one, of the resiliently deformable material listed above. First side 112 can be fabricated using any of a number of plastics manufacturing methods, including but not limited to: suspension polymerization, emulsion polymerization, extrusion, and injection molding.

Suspension polymerization is a heterogeneous radical polymerization process that uses mechanical agitation to mix a monomer or mixture of monomers in a liquid phase, for example, water, while the monomers polymerize, forming spheres of polymer. Emulsion polymerization, on the other hand, is a type of radical polymerization that usually starts with an emulsion incorporating water, a monomer, and a surfactant. The most common type of emulsion polymerization is an oil-in-water emulsion, in which droplets of monomer (i.e., the oil) are emulsified (with surfactants) in a continuous phase of water. Water-soluble polymers, for example, polyvinyl alcohols or hydroxyethyl celluloses, can also be used to act as emulsifiers/stabilizers. Bulk polymerization, or mass polymerization, is another plastics formation method which is carried out by adding a soluble initiator to pure monomer in liquid state. The initiator should dissolve in the monomer. The reaction is initiated by heating or exposing to radiation. As the reaction proceeds the mixture becomes more viscous. The reaction is exothermic and a wide range of molecular masses are produce.

Additional plastics formation methods include extrusion and injection molding. Extrusion methods can include, but are not limited to, production of melt-blown and spun-bond fibers to form long rolls for future conversion. Injection molding is a plastics shaping technique in which polymerized plastics are fed into a heated barrel, mixed, and forced into a mold cavity where it cools and hardens to the configuration of the cavity. related techniques include blow molding and injection-stretch blow molding, which involve a combined method of both extrusion and molding.

Seam 116, as illustrated in FIG. 1, can be fused using any one of a number of fusing techniques, including, but not limited to: hot gas welding, heat sealing, extrusion welding, contact welding, high frequency welding, injection welding, ultrasonic welding, friction welding, laser welding, solvent welding, and other plastic combining method which is functionally apparent.

Hot gas welding, or hot air welding, is a plastic welding technique using a heat gun, or hot air welder, which produces a jet of hot air that softens the at least two elements to be joined and a plastic filler rod, all of which must be of the same or a very similar plastic. Certain types of plastics, however, do not need to follow this rule, for example, welding PVC to acrylic is an exception to this rule. In the case of webs and films, a filler rod may not be used. Two sheets of plastic are heated via a hot gas or a heating element and then rolled together. This is a quick welding process and can be performed continuously.

Heat sealing is the process of sealing one thermoplastic to another similar thermoplastic using heat and pressure. The direct contact method of heat sealing utilizes a constantly heated die or sealing bar to apply heat to a specific contact area or path to seal or weld the thermoplastics together. Heat sealing is used for many applications, including heat seal connectors, thermally activated adhesives and film or foil sealing.

With freehand welding, the jet of hot air (or an inert gas) from the welder is played on the weld area and the tip of the weld rod at the same time. As the rod softens, it is pushed into the joint and fuses to the parts. This process is slower than most others, but it can be used in almost any situation.

With speed welding, a plastic welder, similar to a soldering iron in appearance and wattage, is fitted with a feed tube for the plastic weld rod. The speed tip heats the rod and the substrate, while at the same time it presses the molten weld rod into position. A bead of softened plastic is laid into the joint, and the parts and weld rod fuse. With some types of plastic, for example, polypropylene, the melted welding rod must be "mixed" with the semi-melted base material being fabricated or repaired.

Extrusion welding allows the application of bigger welds in a single weld pass. It is the preferred technique for joining material over 6 mm thick. A Welding rod is drawn into a miniature hand held plastic extruder, plasticized, and forced out of the extruder against the parts being joined, which are softened with a jet of hot air to allow bonding to take place.

Contact welding is similar to spot welding except that heat is supplied with conduction of a pincher tip instead of electrical conduction. At least two plastic parts are brought together where heated tips pinch them, melting and joining the parts in the process. Related to contact welding is hot plate welding, which is used to weld larger parts, or parts that have a complex weld joint geometry. The at least two parts to be welded are placed in the tooling attached to the two opposing platens of a press. A hot plate, with a shape that matches the weld joint geometry of the parts to be welded, is moved in position between the two parts. The two opposing platens move the parts into contact with the hot plate until the heat softens the interfaces to the melting point of the plastic. When this condition is achieved the hot plate is removed, and the parts are pressed together and held until the weld joint cools and re-solidifies to create a permanent bond. The most common form of this welding is butt heat fusion welding which welds two circular tubes end to end.

High frequency welding is possible where certain plastics with chemical dipoles, for example, PVC, polyamides and acetates can be heated with high frequency electromagnetic waves. High frequency welding uses this property to soften the plastics for joining. The heating can be localized, and the process can be continuous.

In a ferromagnetic work piece, plastics can be induction welded by formulating them with metallic or ferromagnetic compounds, called susceptors. These susceptors absorb electromagnetic energy from an induction coil, become hot, and lose their heat energy to the surrounding material by thermal conduction.

Radio frequency is a technology where at least two pieces of material are placed on a table press that applies pressure to both surface areas. Dies are used to direct the welding process. When the press comes together, high frequency waves (commonly, for example, 27.120 MHz) are passed through the small area between the die and the table where the weld takes place. This high frequency field causes the molecules in certain materials to move and get hot, and the combination of this heat under pressure causes the weld to take the shape of the die.

In ultrasonic welding, high frequency (for example, 15 kHz to 40 kHz) low amplitude vibration is used to create heat by way of friction between the materials to be joined. The interface of the two parts is specially designed to concentrate the energy for the maximum weld strength. Ultrasonic can be used on almost all plastic material. It is the fastest heat sealing technology available.

In friction welding, the two parts to be assembled are rubbed together at a lower frequency (typically, for example, 100-300 Hz) and higher amplitude (typically, for example, 1 to 2 mm (0.039 to 0.079 in)) than ultrasonic welding. The friction caused by the motion combined with the clamping pressure between the two parts creates the heat which begins to melt the contact areas between the two parts. At this point, the plasticized materials begin to form layers that intertwine with one another, which therefore results in a strong weld. At the completion of the vibration motion, the parts remain held together until the weld joint cools and the melted plastic re-solidifies. The friction movement can be linear or orbital, and the joint design of the two parts has to allow this movement.

Laser welding requires at least one part to be transmissive to a laser beam and either the other part absorptive or a coating at the interface to be absorptive to the beam. The two parts are put under pressure while the laser beam moves along the joining line. The beam passes through the first part and is absorbed by the other one or the coating to generate enough heat to soften the interface creating a permanent weld. Semiconductor diode lasers are typically used in plastic welding. Wavelengths in the range of 808 nm to 980 nm can be used to join various plastic material combinations. Power levels from less than 1 W to 100 W are needed depending on the materials, thickness and desired process speed.

In solvent welding, a solvent is applied which can temporarily dissolve the polymer at room temperature. When this occurs, the polymer chains are free to move in the liquid and can mingle with other similarly dissolved chains in the other component. Given sufficient time, the solvent will permeate through the polymer and out into the environment, so that the chains lose their mobility. This leaves a solid mass of entangled polymer chains which constitutes a solvent weld.

Any other functionally apparent seam-fusing method may also be used. For example, where elements of the inflatable chamber 110 are fabricated from a textile or other non-plastic material, sewing, and other non-plastic seam methods are contemplated.

FIG. 1 further illustrates a valve 120 embedded in first side 112. Valve 120 can be formed from a deformable plastic, for example, polyvinyl chloride (also known as PVC). However, a number of materials are contemplated, including but not limited to, vinyl, thermoplastics, for example, polyethylene, polypropylene, polystyrene, polyesters, polycarbonate, nylon, polymath methacrylate, other pliable plastics, and any other material which can properly function as a valve. Valve 120 can be fabricated using any of the manufacturing methods described above. Valve 120 can also be embedded into first side 112 using any of the seam-fusing methods described in paragraphs above.

A valve is a device that regulates, directs or controls the flow of a fluid 190 by an opening, closing, or partially obstructing various passageways. Fluid 190 can comprise, for example, gases, liquids, fluidized solids, or slurries. The general laws of thermodynamics describe that any fluid 190 attempts to reach a state of equilibrium. Therefore, in an open valve 120, fluid 190 flows in a direction from higher pressure to lower pressure.

As illustrated in FIG. 1, valve 120 is a low pressure valve made from an elastic plastic material. However, a number of valve configurations are contemplated. However, all configurations of valve 120 contemplated will comprise at least a valve body, a valve stem, and a valve port. Additional valve elements can also incorporated, including but not limited to, a bonnet, gaskets, a handle or actuator, discs, a seat, valve balls, springs and trim. Other functionally compatible valve elements may also be used in necessary.

A valve body is the outer casing of at least part or all of the valve that contains the internal parts or trim. The bonnet is the part of the encasing through which a stem passes and that forms a guide and seal for the stem. The bonnet typically is affixed to the valve body. A bonnet acts as a cover on the valve body. During manufacture of the valve, the internal parts are put into the body and then the bonnet is attached to hold everything together inside. To access internal parts of a valve, a user would take off the bonnet, usually for maintenance. Many valves do not have bonnets; for example, plug valves usually do not have bonnets. Many ball valves do not have bonnets since the valve body is put together in a different style, such as being screwed together at the middle of the valve body.

Ports are passages that allow fluid 190 to pass through the valve. Ports are obstructed by the valve member or disc to control flow. Valves most commonly have two ports but may have one port or a plurality of ports. The valve is generally connected at its ports to components. Connection methods can include but are not limited to threadings, compression fittings, glue, cement, flanges, or welding.

There are a variety of types of valve 120 which can be fabricated in such a manner as to be functionally compatible with being embedded into the first side 112 of the inflatable chamber 110. Examples include, but are not limited to, ball valves, disc valves, check valves, choke valve, diaphragm valves, gate valves, globe valves, needle valves, pinch valves, piston valves, plug valves, poppet valves, spool valves, thermal expansion valves, pressure reducing valves, and safety valves.

As illustrated in FIG. 1, valve 120 can be operated manually by a user. However, further valve operation methods are contemplated, for example, valve 120 can be also be automatic, driven by changes in pressure, temperature, or fluid 190 flow. These changes may act upon valve elements such as a diaphragm or a piston which in turn activates the valve 120.

Lastly, FIG. 1 illustrates a vehicle debris deflector 100 whose purpose is to deflect debris from a gap situated between a vehicle seat, an adjacent console, and a seat belt fastening element, for example, if the inflatable chamber 110 is at least partially inflated with a fluid 190 via the valve 120, the inflatable chamber 110 expands and compresses to fill the gap between the passenger seat, the console unit and the safety belt receiving element. The inflatable chamber 110 can slide parallel to the passenger seat, the vehicle console unit and the vehicle safety belt receiving element without losing expansion and compression when the vehicle passenger seat is engaged in longitudinal motion. This purpose will be further described below in reference to FIG. 4 and as it pertains to the method of use illustrated in FIG. 5.

FIG. 2 illustrates a side view of the exemplary embodiment of the present invention, more specifically, a vehicle debris deflector 200, further including an inflatable chamber 210, a first side 212, a second side 214, a seam 216 and a valve 220.

The side view illustrated in FIG. 2 depicts both the first side 212 and the second side 214 of the inflatable chamber 210. First side 212 and the inflatable chamber 210 generally are described in more detail with respect to FIG. 1. Therefore, discussion relating to FIG. 2 will describe in more detail second side 214 and its relation to first side 212 and its function as an element of inflatable chamber 210.

FIG. 2 illustrates second side 214 as being essentially a mirror image of first side 212. However, additional functional structures of second side 214 are also contemplated. For example, second side 214 can have at least a portion of dimensional structure that are the same, similar or different than the dimensional structure of first side 212.

Since inflatable chamber 210 can change in volume based on the volume of fluid (see FIG. 1, 190) retained inside of the chamber 210, the second side 214, for example, can be fabricated from certain materials which even though fabricated to the same or similar dimensions to first side 212, will result in compression and/or expansion of the material based on the volume of fluid inside the chamber 210. This is also known as a reversible compressible formation of materials. The materials which can have these properties include, but are not limited to, elastic plastics, for example: polyvinyl chloride (PVC), vinyl, thermoplastics, for example, polyethylene, polypropylene, polystyrene, polyesters, polycarbonate, nylon, polymath methacrylate, and other pliable plastics.

The volume of fluid necessary to expand and/or compress inflatable chamber 210 is dependent solely on the specific vehicle the debris deflector 200 is to be used in. Different vehicles have varied dimensions and user elements contained within them. Therefore, it is further contemplated that second side 214 as illustrated in FIG. 2, can be fabricated from the same, similar or different resiliently deformable material as first side 212 based on the specific dimensions of the gap which needs to be filled. It is further contemplated that at least a portion of second side 214 and at least a portion of first side 212 can be fabricated from a plurality of materials, so as to have the highest reversible compressive formation, i.e., to properly deflect debris from a specified gap. Any combinations of the materials listed above, which are compatible with one another are contemplated.

Additional materials are also contemplated for use in fabrication of second side 214, for example, textiles and other functionally compatible material as described in more detail in FIG. 1 with reference to first side 112.

FIG. 3 further illustrates the exemplary embodiment of the present invention, more specifically, a perspective view of the debris deflector apparatus 300 while fully inflated to a volume 340.

FIG. 3 illustrates all the exemplary aspects of the exemplary embodiment fully described in FIGS. 1 and 2, more specifically, the vehicle debris deflector 300, inflatable chamber 310, first side 312, second side 314, seam 316, and fluid 390. FIG. 3 further illustrates an additional exemplary aspect, volume 340.

Volume is a quantity of three-dimensional space enclosed by some closed boundary, for example, the space that a substance (i.e., solid, liquid, gas, or plasma) or shape occupies or contains. FIG. 3 illustrates the quantity of three-dimensional space enclosed by inflatable chamber 310, containing fluid 390.

Volume is often quantified numerically using the SI derived unit, known as the cubic meter. The volume of a container is generally understood to be the capacity of the container, i. e. the amount of fluid that the container could hold, rather than the amount of space the container itself displaces. Therefore, FIG. 3 illustrates volume 340 as the amount of fluid 390 that inflatable chamber 310 can hold.

FIG. 3 illustrates vehicle debris deflector 300 as having a cylindrical shape; however, any functionally necessary shape is contemplated. For example, vehicle debris deflector 300 can have a cubic, conical, helical or any other functionally necessary shape, based on the specific vehicle gap which the debris deflector 300 is to be used in. Volumes of some simple shapes, such as regular, straight-edged, and circular shapes can be easily calculated using arithmetic formulas. The volumes of more complicated shapes can be calculated by integral calculus if a formula exists for the shape's boundary. One-dimensional figures (such as lines) and two-dimensional shapes (such as squares) are assigned zero volume in the three-dimensional space. In addition, any irregular shape is also contemplated, as long as the shape has a reversible compressive formation as described above.

Furthermore, the volume of a solid, both regularly and irregularly shaped, can be determined by fluid displacement. For the given exemplary embodiment, it can be assumed that vehicle debris deflector 300 and its elements, specifically inflatable chamber 310, first side 312, and second side 314 are a solid. Therefore, the optimal volume required to properly position the debris deflector 300 into a gap between a vehicle seat, a console unit, and a seat belt element can be determined by determining the volume of fluid, in this instance, air, displaced inside of the gap. This determination can be made using a guess and check method or any other measurement method available to a user.

FIG. 4 illustrates an exemplary use and exemplary environment 400 for use of the present invention, more specifically, the passenger compartment of a motor vehicle. More specifically, vehicle debris deflector 410 is positioned to obstruct a gap 440 between a vehicle seat 460, a console unit 450 and a seat belt element 470.

While positioned in the gap 440, the inflatable chamber (not shown) on the vehicle debris deflector 410 extends longitudinally beyond the back portion of the passenger seat 460. This longitudinal extension allows the inflatable chamber expand and compress to specifically fill the gap existing where the safety belt receiving element extends out from the vehicle passenger seat.

The optimal volume to position the vehicle debris deflector 410 in the gap 440 is when the inflatable chamber is at least partially inflated. The volume necessary for partial inflation will be best determined based on the specific vehicle into which the vehicle debris deflector 410 will be positioned to obstruct gap 440. When it is partially inflated, the inflatable chamber can expand and compress to fill the gap between the passenger seat, the console unit and the safety belt receiving element. Additional and/or adjustments to the fluid level within the inflatable chamber may be necessary to accommodate the specified gap, however, when the optimal volume is reached, the inflatable chamber can slide parallel to the passenger seat, the vehicle console unit and the vehicle safety belt receiving element without losing expansion and compression when the vehicle passenger seat is engaged in longitudinal motion.

FIG. 5 illustrates an exemplary method of using any and/or all combinations of the present invention. The method begins in FIG. 5, at the start 510.

First, the exemplary embodiment of the inflatable chamber in inflated via a valve at 520. At this method step, partial inflation is assumed to be the optimal volume, because full inflation of the inflatable chamber may compromise the full functionality of the debris deflector. The act of inflating the inflatable chamber can be initiated by a user, for example, with the user blowing air into the valve from their mouth or a manually operated air pump. Inflation can also occur automatically via activation of a automatic inflating element. Further acts of inflation can include any method for increasing the fluid volume within the inflatable chamber as are functionally apparent.

At 530, the partially inflated debris deflector is placed in a gap between a passenger seat, a console unit and a safety belt receiving element. It is contemplated in this exemplary method that a user manually places the debris deflector into the gap. However, it is further contemplated that additional methods of placing the debris deflector into the gap may be considered. Once placed, the inflatable chamber of the debris deflector can expand and compress to fill the gap between the passenger seat, the console unit and the safety belt receiving element. Furthermore, adjustment of the physical location of the debris deflector may be necessary at 530, to properly situate the inflatable chamber so that it will fully obstruct the gap created.

At 540, the volume of the inflatable chamber can be adjusted via the valve. In this exemplary method, adjusting the volume is contemplated to be completed manually by a user, whereby the user activates the valve to release fluid contained in the inflatable chamber or manually adds fluid to the inflatable chamber. It is further contemplated that this adjustment step may be accomplished using an automatic method, for example, a sensor embedded into the inflatable chamber determining the optimal volume based on the existing gap displacement volume and activating an automatic inflation and/or deflation apparatus.

At 550, a user can operate the passenger seat and the exemplary debris deflector can slide parallel to the passenger seat, the vehicle console unit and the vehicle safety belt receiving element without losing expansion and compression when the vehicle passenger seat is engaged in this longitudinal motion. It is contemplated at step 550 that the debris deflector is inflated at or close to an optimal volume which results in a reverse compressive formation. If the debris deflector is not inflated to or close to an optimal volume, it is contemplated that the sliding will not be parallel and the debris deflector can then lose expansion and compression based on the non-optimal fluid volume. If this were to occur at method step 550, a user can restart method step 540, and adjust the volume in the inflatable chamber via the valve, until an optimal volume or close to an optimal volume can be achieved.

A method of servicing the exemplary embodiment of the vehicle interior debris deflector is further contemplated. This method of service can include, but is not limited to: general maintenance, repair, modification and replacement in whole or in part one of, individually or in combination with one another, any of the following: an inflatable chamber having a first side and a second side joined along a seam, and a valve embedded in at least one of the first side and/or the second side of the inflatable chamber.

The following are additional and/or exemplary aspects and embodiments of the present invention as illustrated in FIGS. 1-4. One or more of these exemplary aspects and/or embodiments can be combined with the basic invention as embodied above, to form additional embodiments and/or reasonable changes and/or improvements to the present exemplary embodiment.

The first side of the inflatable chamber can be formed of at least one of a resiliently deformable material capable of reversible compressible conformation to the shape of the gap and the second side of the inflatable chamber comprises at least one of a different resiliently deformable material capable of reversible compressible conformation to the shape of the gap.

The inflatable chamber can further include: one or more of the inflatable chamber, further including one or more second inflatable chambers joined to the first inflatable chamber along their respective seams.

The inflatable chamber can further include: one or more of the inflatable chamber, wherein an interior surface area defined by the inflatable chamber is larger than a planar area defined by the one or more second inflatable chambers, fixedly joined with the first inflatable chamber along their respective seams. Furthermore, where there is one or more of the inflatable chamber, the one or more chambers can include one or more second inflatable chambers joined to the first inflatable chamber along their respective seams further comprise one or more valves.

The valve can further include a leak reducing element, wherein the leak reducing element is compressed when the inflatable chamber is being inflated and/or deflated. The valve can also further include an automatic inflating apparatus, wherein when the automatic inflating apparatus is activated; the inflatable chamber expands and compresses to fill the gap.

Furthermore, where the valves of the one or more of the inflatable chamber can further include one or more second inflatable chambers joined to the first inflatable chamber along their respective seams further comprise one or more automatic inflating apparatus, wherein when the one or more automatic inflating apparatus are activated, the one or more inflatable chambers and one or more second inflatable chambers expand and compress to the gap at different rates based on a pressure differential sensor contained in the one or automatic inflating apparatuses.

The following are additional and/or exemplary aspects and embodiments of the present method as described in FIG. 5. One or more of these method elements can be combined with the basic method as embodied above, to form additional method embodiments and/or reasonable changes and/or improvements to the present exemplary method embodiment.

The inflatable chamber can further comprise one or more of the inflatable chamber, further comprising one or more second inflatable chambers joined to the first inflatable chamber along their respective seams.

The inflatable chamber can further comprise: one or more of the inflatable chamber, wherein an interior surface area defined by the inflatable chamber is larger than a planar area defined by the one or more second inflatable chambers, fixedly joined with the first inflatable chamber along their respective seams.

The valve can further comprise a leak reducing element, wherein the leak reducing element is compressed when the inflatable chamber is being inflated and/or deflated. The valve can also further comprise an automatic inflating apparatus, wherein when the automatic inflating apparatus is activated; the inflatable chamber expands and compresses to fill the gap.

Also, the one or more of the inflatable chamber can further comprise one or more second inflatable chambers joined to the first inflatable chamber along their respective seams further comprise one or more valves. Furthermore, the valves of the one or more of the inflatable chamber further comprising one or more second inflatable chambers joined to the first inflatable chamber along their respective seams further comprise one or more automatic inflating apparatus, wherein when the one or more automatic inflating apparatus are activated, the one or more inflatable chambers and one or more second inflatable chambers expand and compress to the gap at different rates based on a pressure differential sensor contained in the one or automatic inflating apparatuses.

Additional methods, aspects and elements of the present inventive concept are contemplated in use in conjunction with individually or in any combination thereof which will create a reasonably function device to be of use as a grabbing apparatus to removably connect to a docking location. Methods of use are also contemplated using all optional aspects and embodiments as described above, individually or in combination thereof.

It will be apparent to one of ordinary skill in the art that the manner of making and using the claimed invention has been adequately disclosed in the above-written description of the exemplary embodiments and aspects. It should be understood, however, that the invention is not necessarily limited to the specific embodiments, aspects, arrangement and components shown and described above, but may be susceptible to numerous variations within the scope of the invention.

Moreover, particular exemplary features described herein in conjunction with specific embodiments and/or aspects of the present invention are to be construed as applicable to any embodiment described within, enabled thereby, or apparent wherefrom. Thus, the specification and drawings are to be regarded in a broad, illustrative, and enabling sense, rather than a restrictive one.

Further, it will be understood that the above description of the embodiments of the present invention are susceptible to various modifications, changes, and adaptations, and the same are intended to be comprehended within the meaning and range of equivalents of the appended claims.

Therefore, I claim:

1. A vehicle interior debris deflector for obstructing a gap between a passenger seat, a console unit and a safety belt receiving element, comprising:
    an inflatable chamber having a first side and second side fused to one another along a seam, when placed in the gap between the passenger seat, the console unit and the safety belt receiving element said inflatable chamber extends longitudinally from a front portion of the passenger seat to a back portion of the passenger seat and is adjacent and abutting to the console unit; and
    a valve embedded in at least one of the first side and the second side for adding and removing air from the inflatable chamber;
    wherein when the inflatable chamber is at least partially inflated via the valve, the inflatable chamber expands and compresses to fill the gap between the passenger seat, the console unit and the safety belt receiving element, said inflatable chamber sliding parallel to the passenger seat, the vehicle console unit and the vehicle safety belt receiving element without losing expansion and compression when the vehicle passenger seat is engaged in longitudinal motion.

2. The vehicle interior debris deflector of claim 1, wherein the inflatable chamber is formed of a resiliently deformable material capable of reversible compressible conformation to the shape of the gap.

3. The vehicle interior debris deflector of claim 1, wherein the first side of the inflatable chamber is formed of at least one of a resiliently deformable material capable of reversible compressible conformation to the shape of the gap and the second side of the inflatable chamber comprises at least one of a different resiliently deformable material capable of reversible compressible conformation to the shape of the gap.

4. The vehicle interior debris deflector of claim 1, wherein the inflatable chamber extends longitudinally beyond the back portion of the passenger seat.

5. The vehicle interior debris deflector of claim 1, wherein the inflatable chamber further includes: one or more of the inflatable chamber, further including one or more second inflatable chambers joined to the first inflatable chamber along their respective seams.

6. The vehicle interior debris deflector of claim 1, wherein the inflatable chamber further includes: one or more of the inflatable chamber, wherein an interior surface area defined by the inflatable chamber is larger than a planar area defined by the one or more second inflatable chambers, fixedly joined with the first inflatable chamber along their respective seams.

7. The vehicle interior debris deflector of claim 1, wherein the valve further includes a leak reducing element, wherein the leak reducing element is compressed when the inflatable chamber is being inflated and/or deflated.

8. The vehicle interior debris deflector of claim 1, wherein the valve further includes an automatic inflating apparatus, wherein when the automatic inflating apparatus is activated; the inflatable chamber expands and compresses to fill the gap.

9. The vehicle interior debris deflector of claim 1, wherein there is one or more of the inflatable chamber, the one or more chambers includes one or more second inflatable chambers joined to the first inflatable chamber along their respective seams further comprise one or more valves; and
    wherein the valves of the one or more of the inflatable chamber further includes one or more second inflatable chambers joined to the first inflatable chamber along their respective seams further comprise one or more automatic inflating apparatus, wherein when the one or more automatic inflating apparatus are activated, the one or more inflatable chambers and one or more second inflatable chambers expand and compress to the gap at different rates based on a pressure differential sensor contained in the one or automatic inflating apparatuses.

10. A method of using a vehicle interior debris deflector, comprising:
    inflating an inflatable chamber via a valve;

placing the inflatable chamber in a gap between a passenger seat, a console unit and a safety belt receiving element, wherein the inflatable chamber expands and compresses to fill the gap between the passenger seat, the console unit and the safety belt receiving element adjusting an inflated volume of the inflatable chamber via the valve; and operating the passenger seat, wherein the inflatable chamber slides parallel to the passenger seat, the vehicle console unit and the vehicle safety belt receiving element without losing expansion and compression when the vehicle passenger seat is engaged in longitudinal motion.

11. A method of servicing a vehicle interior debris deflector, comprising general maintenance, repair modification and replacement in whole or in part one of, individually or in combination with one another, any of the following: an inflatable chamber having a first side and a second side joined along a seam, and a valve embedded in at least one of the first side and/or the second side of the inflatable chamber.

* * * * *